April 21, 1953     A. H. WERNER     2,635,875
RECIPROCATING FEEDER FOR SHEET MATERIAL
Filed Oct. 28, 1948     2 SHEETS—SHEET 1
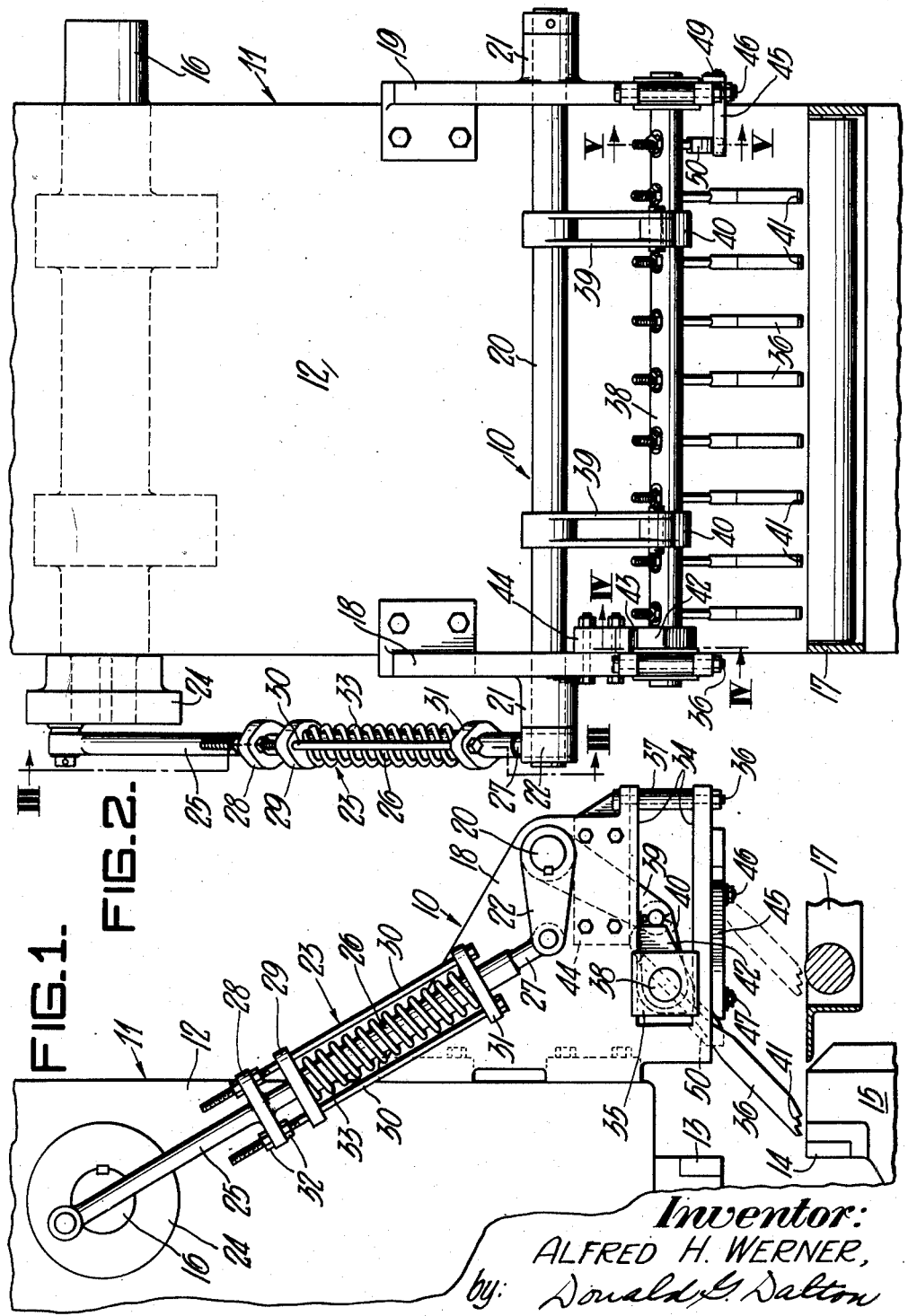
Inventor:
ALFRED H. WERNER,
by: Donald G. Dalton
his Attorney.

April 21, 1953 — A. H. WERNER — 2,635,875
RECIPROCATING FEEDER FOR SHEET MATERIAL
Filed Oct. 28, 1948 — 2 SHEETS—SHEET 2
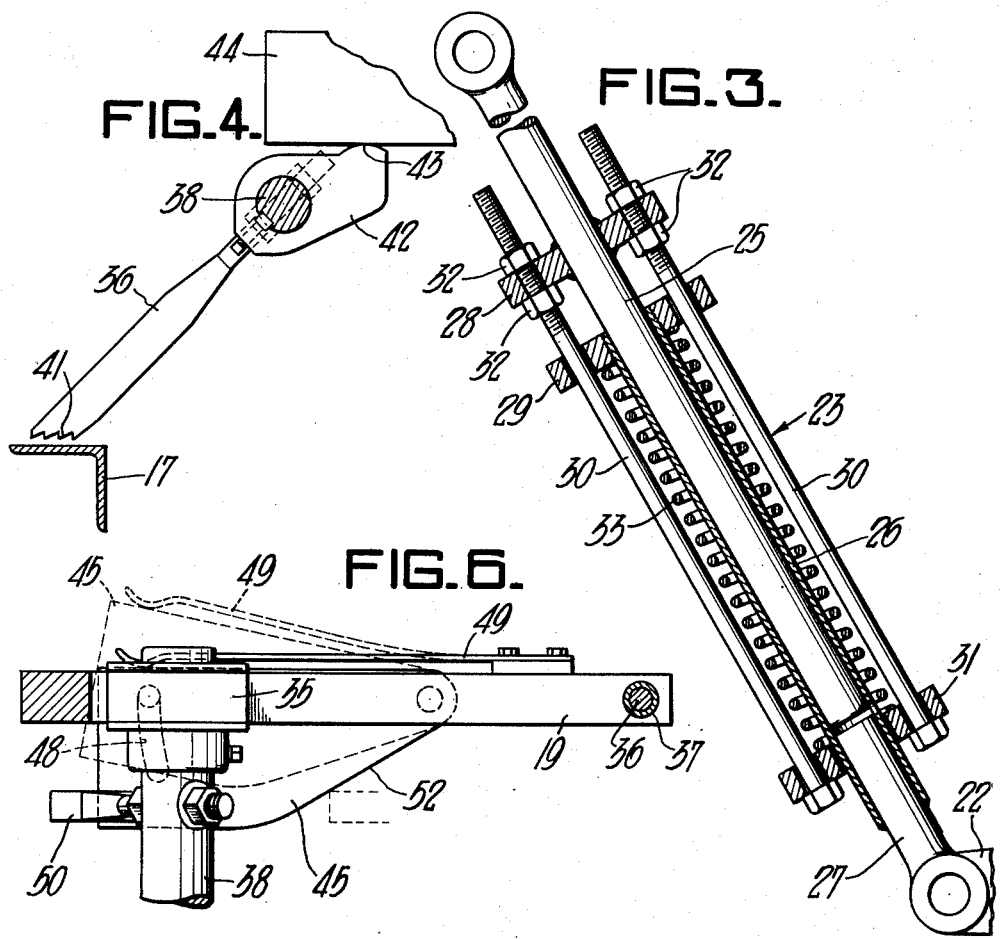
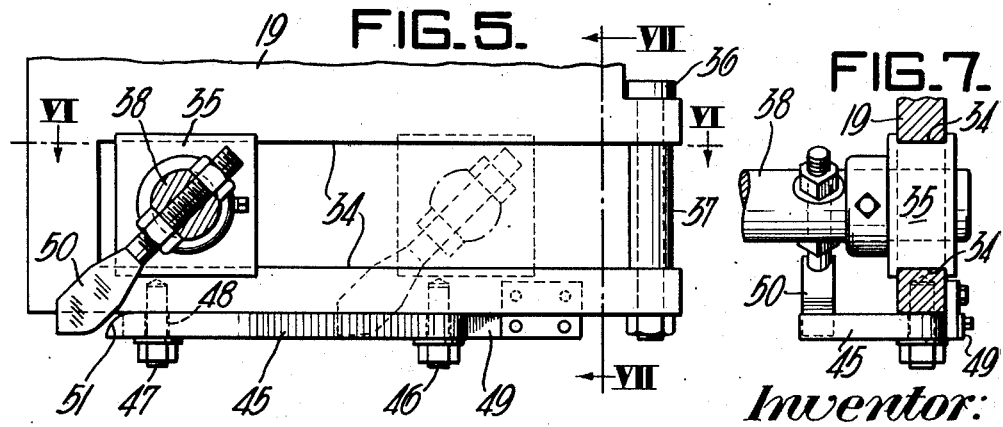
Inventor:
ALFRED H. WERNER,
by Donald G. Dalton
his Attorney.

Patented Apr. 21, 1953

2,635,875

UNITED STATES PATENT OFFICE 2,635,875

RECIPROCATING FEEDER FOR SHEET MATERIAL

Alfred H. Werner, Youngstown, Ohio, assignor to United States Steel Corporation, a corporation of New Jersey Application October 28, 1948, Serial No. 57,085

2 Claims. (Cl. 271—54)

This invention relates to mechanism for feeding sheet or plate material and, in particular, to a feeder of the reciprocating pusher type.

It is frequently desirable to feed pieces of sheet or plate material automatically to a machine such as a punch or shear. A table of live rollers suffices if the pieces are long enough and the machine is designed to pull the piece forward when once started. If short pieces are to be handled, it may be impossible to place the last live roller within a distance from the machine less than the minimum length of the piece. Some machines, furthermore, are not self-feeding. In certain instances, therefore, it has been necessary heretofore to station an operator at the machine to feed the pieces across the portion of the machine base or platen between the last live roller of the table and the working parts of the machine. One example is the scrap-cutting shear to which the ends cropped from lengths of hot-rolled strip are fed for severance into pieces of the desired size for charging as scrap. Manual feeding is necessary to supplement the roller table because a double-thickness cut may result from leaving a short piece on the entry side of the shear where it may be engaged and pushed into the shear by the next piece as it is fed by the table rollers. Such a cut overloads the shear and may cause damage to or breakage of the blades.

I have invented a novel reciprocating pusher effective when driven by suitable power means to push sheet or plate material into the entry side of a machine by a series of repeated thrusts. The pusher is thus capable of handling pieces of minimum length as well as pieces of much greater length. In a preferred embodiment, I mount a plurality of pusher fingers on a transverse rock shaft. The shaft is reciprocable toward and from the machine above the platen thereof. I provide cam means effective to rock the shaft and tilt the fingers upwardly as the shaft moves outwardly or away from the machine. I also provide stop means on the shaft limiting downward tilting of the fingers as the shaft moves toward the machine to prevent them from engaging the platen yet permitting them to engage a piece of material thereon. The shaft is preferably journaled in bearing blocks slidable in a supporting frame and is reciprocated by a second rock shaft acting through arms having links pivoted thereto.

A complete understanding of the invention may be obtained from the following detailed description and explanation which refer to the accompanying drawings illustrating the preferred embodiment. In the drawings, Figure 1 is an end elevation showing the invention applied to a down-cut cam-operated scrap shear, with parts in section;

Figure 2 is a side elevation;

Figure 3 is a partial section taken on the plane of line III—III of Figure 2;

Figure 4 is a partial section taken on the plane of line IV—IV of Figure 2 with parts in elevation;

Figure 5 is a sectional view taken along the plane of line V—V of Figure 2 with parts in elevation;

Figure 6 is a sectional view taken along the plane of line VI—VI of Figure 5; and Figure 7 is a sectional view taken along the plane of line VII—VII of Figure 5.

Referring in detail to the drawings, the feeding mechanism of my invention indicated generally at 10 is illustrated as applied to a scrap-cutting shear 11 including a housing or frame casting 12 having an upper knife 13 vertically reciprocable therein and adapted to cooperate with a lower knife 14 fixed in a platen 15 or work-holding table. Shears of this type are well known and no further detailed description thereof is necessary except to mention the cam shaft 16 journaled in the housing which is driven from any suitable source of power and reciprocates the upper blade 13 of the shear continuously through any suitable means (not shown). Sheet or plate material to be sheared is delivered to the shear along a roller table 17 of which the shear platen 15 constitutes a continuation. The rollers of the table 17 are driven in any suitable manner to forward a piece of material deposited thereon toward the shear.

The feeding mechanism of my invention is carried by spaced supporting members such as brackets or side plates 18 and 19 secured to the shear housing above the platen 15. A rock shaft 20 journaled in bearings 21 formed on the brackets has a crank 22 at one end. A pitman 23 is pivoted to the crank and to a pin projecting from a crank disk 24 secured on one end of the cam shaft 16. The pitman 23 is shown in detail in Figure 3. It comprises center rod 25 slidable in a sleeve 26 secured to a stub rod 27. The rods 25 and 27 have eyes to fit the crank pin on disk 24 and a pivot pin extending through crank 22. A flange 28 is secured to the center rod 25 intermediate the ends thereof. A flange 29 is threaded on the end of sleeve 26 remote from rod 27. Side rods 30 extend through the flanges 28 and 29 and a flange 31 slidable on the sleeve 26. The side rods are adjustably secured to the flange 28 by nuts 32. A compression spring 33 surrounding the sleeve 26 is confined between the flanges 29 and 31.

As a result of the construction described, when the rod 25 moves downwardly, it bottoms on the stub rod 27 and positively actuates the crank 22 on continued rotation of the crank disk 24. As the rod 25 moves upwardly, however, the pull exerted thereby is applied to the sleeve 26 by compressing the spring 33. Clockwise angular movement of crank 22 is thus cushioned by the spring. Reverse movement of the crank is effected positively. The purpose of this construction will become apparent shortly.

The brackets 18 and 19 have slots adjacent the bottom thereof extending inwardly from the outer ends forming ways 34 in which bearings in the form of blocks 35 are slidable. The blocks have their edges grooved as shown to accommodate the ways. The open ends of the slots are closed after insertion of the bearing blocks by bolts 36 extending through spacer sleeves 37. A transverse rock shaft 38 is journaled at its ends in the blocks 35 and is provided with a plurality of pusher fingers 36 spaced thereon. Arms 39 on shaft 20 reciprocate the shaft 38 sidewise, i e., longitudinally of table 17, by means of links 40 pivoted to the arms and shaft. The fingers 36 have hardened teeth 41 at the lower end thereof adapted to engage material resting on the table 17 and push it across the platen 15 of the shear by a series of repeated thrusts. The fingers 36 have their upper ends turned round and inserted in transverse holes drilled in shaft 38. Each finger is adjustable longitudinally by clamping nuts threaded thereon. From the description thus far given, it will be evident that the pitman 23 oscillates the rock shaft 20 and crank 22 on rotation of the cam shaft 16, thereby causing the fingers 36 to reciprocate back and forth along the table 17 between the position shown in solid lines and that shown in dotted lines.

In order to prevent the teeth 41 of the fingers 36 from digging into the platen 15, I provide means limiting counterclockwise rotation of shaft 38. This means comprises a dog 42 secured to the shaft adjacent the left hand end thereof as viewed in Figure 2. The dog has a rounded boss 43 slidably engaging the lower edge of a hardened block 44 secured to the inner face of the bracket 18. As shown in Figure 4, the boss engages the block while the teeth 41 are still spaced above the level of table 17 and platen 15, thus providing a stop limiting the descent of the pusher fingers without interfering with the upward tilting thereof effected by means now to be described, for the purpose of clearing a piece of material on the table when the shaft 38 moves away from the shear.

A cam plate 45 is pivoted on a vertical stud bolt 46 threaded into a tapped hole into the bottom of the bracket 19 as best shown in Figures 5 through 7. A similar stud 47 extends through an arcuate slot 48 in the plate 45. The plate is normally held in the position shown in solid lines in Figure 6 by a spring 49 secured to the bracket but is displaceable to the dotted-line position for a purpose which will presently appear. A cam finger 50 is mounted on shaft 38 in the same manner as the fingers 36 and is adapted to engage the inner end of the plate 45 which is rounded as indicated at 51, on rearward or outward movement of shaft 38. As shown in Figure 5, when the cam finger 50 rides up on the rounded forward edge of cam plate 45, the shaft 38 will be tilted clockwise through a small angle. The pusher fingers 36 will thus tilt upwardly so that their lower ends will clear a piece of material delivered by the table 17 and resting on platen 15.

The outer end of the cam plate 45 is beveled or inclined on one side as at 52 so that, after a retraction of the shaft 38, the cam finger 50 clears the plate permitting the fingers 36 to fall down by their own weight until the boss 43 on dog 42 engages the lower edge of the slide 44. When the shaft 38 reaches its extreme rear position and starts forward again, the finger 50 engages the beveled or inclined side 52 of plate 45 thereby causing it to swing on stud 46 from the solid-line position of Figure 6 to the dotted-line position. When the shaft 38 has reached its extreme forward position, the cam finger 50 again clears the cam plate 52 whereupon the spring 49 restores it to the solid-line position in readiness for the next retraction of shaft 38.

It will be apparent that the invention is characterized by several very important advantages. In the first place, the structure is simple yet effective and dispenses with the necessity of manually feeding short pieces of material into the shear. It also eliminates the safety hazard inherent in such operation. The device is relatively inexpensive and requires little or no maintenance. It is mounted directly on the shear frame and is driven from the shear-actuating mechanism thereby avoiding the necessity of a separate frame and power source.

The force exerted by the pitman to cause forward movement of the shaft 38 and pusher fingers is exerted through the compression spring 33. This prevents overstressing or breakage of the parts in case of jamming of a piece being fed to the shear and likewise prevents sudden shock or impact on engagement of the pieces to be fed by the pusher fingers. In other words, the spring permits the piece to be accelerated gradually and thus reduces the reaction resulting therefrom. The dog 42 and slide block 44 control the pusher fingers to prevent them from digging into the platen 15 of the shear, yet permit them effectively to engage the upper surface of the material on the table 17. The cam plate 45 and cam finger 50 cause the pusher fingers to clear material on the table during the backstroke and thus prevent it from being moved away from the shear.

Although I have illustrated and described only a preferred embodiment of the invention, it will be understood that changes in the construction and arrangement disclosed may be made without departing from the spirit of the invention or the scope of the appended claims.

I claim:

1. A reciprocating pusher for feeding sheet material along a table comprising a pair of fixed supports above the level of the table and spaced across the width thereof, said supports having ways formed therein extending lengthwise of the table, a bearing slidable on the ways of each support, a rock shaft extending across the table and journaled in said bearings, pusher fingers spaced along said shaft and extending downwardly therefrom toward the table to engage sheet material thereon, a second rock shaft extending across the table parallel to said first-mentioned shaft and journaled in said supports, an arm on said second rock shaft, a link pivoted to said arm and to said first-mentioned shaft, means for oscillating said second rock shaft on its own axis whereby said arm and link cause sidewise reciprocating movement of said first-mentioned shaft and the fingers carried thereby, rearwardly and forwardly along the table in the direction in which material is to be fed, and reciprocation of said bearings along said ways, a cam finger secured to said first-mentioned shaft and a cam plate on one of said supports engageable by said cam finger on rearward movement of the first-mentioned shaft to tilt the latter and raise said pusher fingers.

2. A device as defined by claim 1 characterized by said cam plate being pivoted on a vertical axis and positioned so as to be displaced laterally by said cam finger on re-engagement thereby as the cam finger starts forward again and means constantly urging said cam plate toward a position in the path of said cam finger to displace the cam finger as it moves rearwardly.

ALFRED H. WERNER.

References Cited in the file of this patent

UNITED STATES PATENTS

| Number | Name | Date |
| --- | --- | --- |
| 226,534 | Moloney | Apr. 13, 1880 |
| 480,756 | Westaway | Aug. 16, 1892 |
| 716,434 | Kneisly | Dec. 23, 1902 |
| 2,027,172 | Irmscher | Jan. 7, 1936 |
| 2,200,409 | Backhouse | May 14, 1940 |
| 2,372,472 | Campbell | Mar. 27, 1945 |
| 2,451,648 | Anderson | Oct. 19, 1948 |